US008860394B2

(12) United States Patent
Houston et al.

(10) Patent No.: US 8,860,394 B2
(45) Date of Patent: Oct. 14, 2014

(54) FAST DYNAMIC VOLTAGE RESPONSE FOR VOLTAGE REGULATORS WITH DROOP CONTROL

(75) Inventors: M. Jason Houston, Cary, NC (US); Steven P. Laur, Raleigh, NC (US); Rhys S. A. Philbrick, Cary, NC (US)

(73) Assignee: Intersil Americas LLC, Milpitas, CA (US)

( * ) Notice: Subject to any disclaimer, the term of this patent is extended or adjusted under 35 U.S.C. 154(b) by 315 days.

(21) Appl. No.: 13/536,786

(22) Filed: Jun. 28, 2012

(65) Prior Publication Data

US 2014/0002047 A1 Jan. 2, 2014

(51) Int. Cl.
*H02M 3/156* (2006.01)
(52) U.S. Cl.
USPC ............................................ 323/285; 323/351
(58) Field of Classification Search
CPC .............. H02M 2001/0025; H02M 2001/0012
USPC ......................................... 323/285, 283, 351
See application file for complete search history.

(56) References Cited

U.S. PATENT DOCUMENTS

2011/0316518 A1* 12/2011 Feng et al. ..................... 323/349
2012/0262136 A1* 10/2012 Nien et al. ..................... 323/272

* cited by examiner

*Primary Examiner* — Harry Behm
*Assistant Examiner* — Matthew Grubb
(74) *Attorney, Agent, or Firm* — Gary Stanford

(57) ABSTRACT

A dynamic voltage response network for a switching regulator with droop control providing a droop control signal includes a voltage identification setting network, a pass and hold system, and a reset network. The voltage identification setting network initiates a hold condition and adjusts an output voltage reference in response to a change in a voltage identification input. The pass and hold system passes the droop control signal during a pass condition and holds the droop control signal during the hold condition. The reset network resets the pass and hold system to the pass condition in response to a reset signal. The reset signal may be provided in response to a variety of conditions, such as load transients, proximity between the developed droop control signal and the held droop control signal, timeout after the output voltage reference is adjusted, among other reset conditions.

20 Claims, 4 Drawing Sheets

FAST DYNAMIC VOLTAGE RESPONSE FOR VOLTAGE REGULATORS WITH DROOP CONTROL

BRIEF DESCRIPTION OF THE DRAWINGS

The benefits, features, and advantages of the present invention will become better understood with regard to the following description and accompanying drawings, in which.

DETAILED DESCRIPTION

Figure 1:
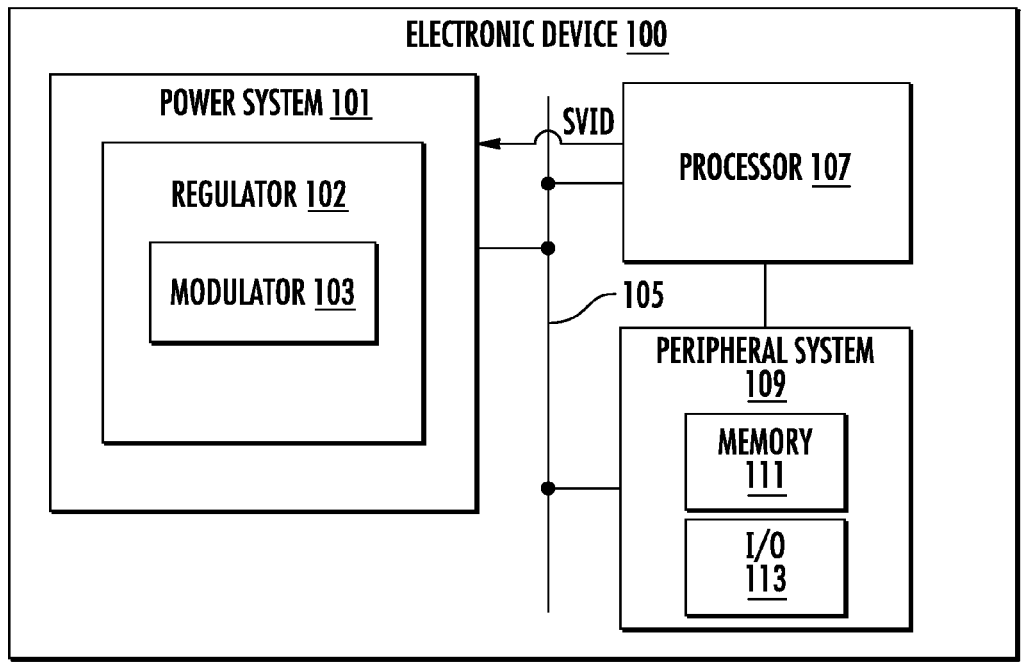
FIG. 1 is a simplified block diagram of an electronic device configured with a power system having a regulator with a modulator implemented with fast dynamic voltage response with droop control according to an embodiment of the present invention.

The benefits, features, and advantages of the present invention will become better understood with regard to the following description, and accompanying drawings. The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Conventional voltage regulators with droop control typically have slow dynamic voltage response. As understood by those of ordinary skill in the art, the droop function is an intentional adjustment of the voltage level of the output voltage as a function of load. As the load increases, the output voltage is proportionately decreased and vice-versa. Dynamic voltage response refers to the response of the voltage regulator when a voltage identification (VID) value is changed to adjust the level of the output voltage. An external device, such as a microprocessor or central processing unit (CPU) provides a VID value to the regulator during operation (real-time) to adjust the level of the output voltage being provided to that device and/or other load devices. The VID function is particularly useful for allowing dynamic adjustment of the output voltage to switch between power modes, such as for switching between different power modes of operation to reduce overall power consumption.

Fast dynamic voltage response is advantageous for faster system response in computing applications. It is desired to be able to switch between the different power modes as fast as possible to optimize power reduction while also minimizing delay in responding to external stimuli, such as from another system or from user input. As an example, a computer system may switch to a lower power mode in the absence of user input, such as from a keyboard or mouse or the like, and to switch back to normal power mode in response to external stimuli, such as input from the keyboard or mouse or the like. It is desired that the computer system be able to switch back to normal power mode to minimize interruption of service. Thus, the sooner the computer system is able to switch between the different power modes, the lower the overall power consumption and the higher the level of service.

Droop control and dynamic voltage response tend to contradict each other when implemented within a voltage regulator. Since the overall load current is difficult to measure or otherwise unavailable, the droop function typically measures or estimates current flowing through the output inductor. In response to a load transient (insertion/release) causing a change (in which the change is an increase or a decrease) of inductor current, the droop function adjusts an output voltage feedback sense level to adjust (decrease/increase) the output voltage level according to droop operation. The VID function provided for dynamic voltage response, on the other hand, may adjust the reference voltage in the feedback control loop to adjust (increase/decrease) the output voltage. The adjustment causes a change (increase/decrease) in modulation (e.g., pulse width of pulse control signal) which causes a corresponding change (increase/decrease) in the inductor current intended to adjust (charge/discharge) the output capacitor to change (increase/decrease) the output voltage. The droop function, however, interprets the change (increase/decrease) of inductor current as a load transient (insertion/release) and attempts to change (increase/decrease) the output voltage accordingly. In this manner, the droop function counteracts the dynamic voltage response. The system eventually settles to the correct output voltage level, but the conflict between the droop control and the dynamic voltage response significantly slows down the transition which is detrimental to the desired fast dynamic voltage response.

Conventional solutions for providing fast dynamic response of a voltage regulator with droop control have several deficiencies. In one configuration, a resistor-capacitor (RC) filter circuit is coupled to the voltage feedback node to cancel the extra droop current with a compensating current. This solution, however, requires customer tuning since the R and C components of the RC filter are selected based on the capacitance of the output capacitor. The output capacitance, however, is not constant from one board to another and from one application to another which complicates the tuning process. Furthermore, tuning can be difficult due to parasitic resistance and inductance in the system and loop dynamics which complicate the ability to accurately predict the inductor current during transitions. Also, drift of aging component values may result in improper operation over time. In addition, the added RC filter may adversely affect desired load transient response.

An alternative solution is to couple a current device to the voltage feedback node drawing the compensating current to cancel the extra droop current. This solution suffers from similar deficiencies as the RC filter solution, including tuning and aging issues among other difficulties.

It is desired to provide fast dynamic response for a voltage regulator with droop control without the deficiencies of the conventional solutions. It is desired to avoid tuning and aging problems and instead provide an automatic, no touch solution for customers. In other words, it is desired to provide an automatic fast dynamic voltage response with droop control.

FIG. 1 is a simplified block diagram of an electronic device 100 configured with a power system 101 having a regulator 102 with a modulator 103 implemented with fast dynamic voltage response with droop control according to an embodiment of the present invention. The power system 101 develops one or more supply voltages which provide power to other system devices of the electronic device 100. In the illustrated embodiment, the electronic device 100 includes a processor 107 and a peripheral system 109, both coupled to receive supply voltages from the power system 101 via a bus 105, which includes any combination of power and/or signal conductors. In the illustrated embodiment, the peripheral system 109 may include any combination of a system memory 111 (e.g., including any combination of RAM and ROM type devices and memory controllers and the like), and an input/output (I/O) system 113, which may include system controllers and the like, such as graphic controllers, interrupt controllers, keyboard and mouse controllers, system storage device controllers (e.g., controllers for hard disk drives and the like), etc. The illustrated system is exemplary only, since many of the processor system and support devices may be integrated onto the processor chip as understood by those skilled in the art.

In the illustrated configuration, the processor 107 provides an SVID command signal to the power system 101, which is ultimately routed to the regulator 102 and/or the modulator 103 to adjust the output voltage. It is desired that the power system 101 be configured to change its output voltage in response to the SVID command as quickly as possible.

The electronic device 100 may be any type of computer or computing device, such as a computer system (e.g., notebook computer, desktop computer, netbook computer, etc.), a media tablet device (e.g., iPad by Apple Inc., Kindle by Amazon.com, Inc., etc.), a communication device (e.g., cellular phone, smartphone, etc.), among other type of electronic devices (e.g., media player, recording device, etc.). The power system 101 may be configured to include a battery (rechargeable or non-rechargeable) and/or may be configured to operate with an alternating current (AC) adapter or the like. The present invention is applicable to any type of computing device with dynamic voltage response and droop control.

Figure 2:
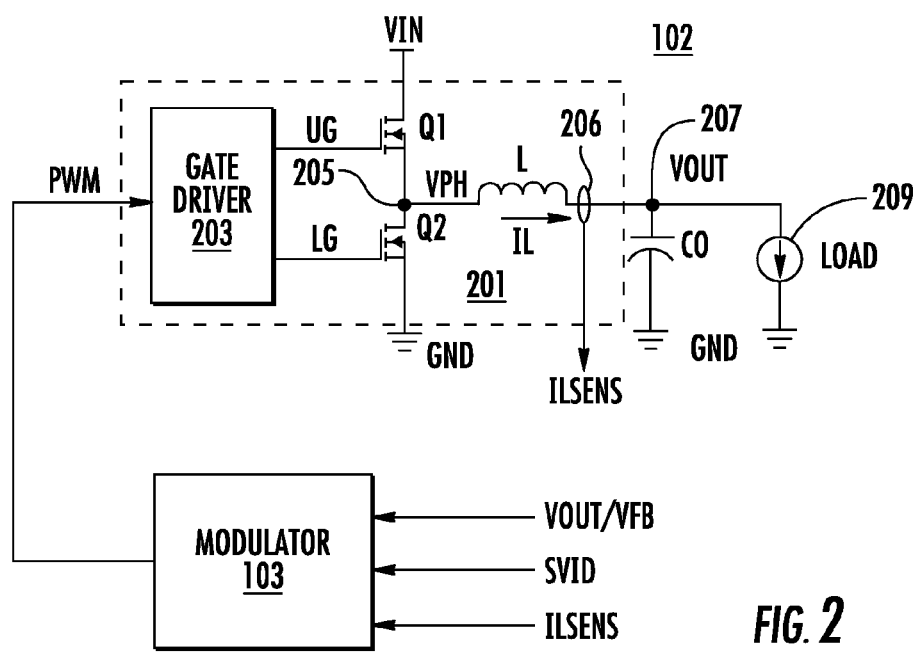
FIG. 2 is a simplified schematic and block diagram of an exemplary buck-type regulator including the modulator of FIG. 1 implemented according to one embodiment.

FIG. 2 is a simplified schematic and block diagram of an exemplary buck-type regulator 102 including the modulator 103 implemented according to one embodiment. The regulator 102 includes a phase circuit 201 which may be implemented for a single phase system or a multiphase system. The phase circuit 201 includes a gate driver 203 receiving a pulse width modulation (PWM) signal and providing a corresponding upper gate signal UG to an upper electronic power switch Q1 and a corresponding lower gate signal LG to a lower electronic power switch Q2. The power switches Q1 and Q2 have their current terminals (e.g., drains and sources) coupled series between an input voltage VIN and a common reference voltage GND (e.g., in which GND represents ground or any other suitable positive or negative reference voltage level). It is noted that GND may represent one or more reference nodes, including one or more ground levels or nodes, such as signal ground, power ground, chassis ground, etc., or any other suitable reference voltage level. The switches Q1 and Q2 are coupled together at an intermediate phase node 205 developing a phase voltage VPH, and an output inductor L has one end coupled to the phase node 205 and its other end coupled to an output node 207 developing an output voltage VOUT. An output capacitor CO and a load 209 are coupled between the output node 207 and GND. The load 209 represents any one or more of the load devices, such as the processor 107 and/or any of devices of the peripheral system 109. In an alternative embodiment, the low side switch Q2 may be replaced by a diode according to a non-synchronous buck regulator topology.

The current IL through the inductor L is sensed, simulated or otherwise synthesized and a corresponding inductor current sense signal ILSENS is provided to a modulator 103. A current sense network 206 is shown for sensing the inductor current IL and providing ILSENS. The current sense network 206 may be an actual resistive or inductively coupled current sensor or the like. It is appreciated, however, that sensing inductor current and providing ILSENS indicative thereof is not limited to an actual current sensor as there are many other methods known to those of ordinary skill in the art for determining the inductor current. One method of determining the inductor current, for example, is to detect or measure the voltage across the series DC resistance (DCR) of the output inductor L using a resistor-capacitor circuit coupled to the output inductor L (e.g., a series resistor and capacitor coupled across the output inductor L). Another method of sensing the inductor current is to provide a sensing resistor in series with the output inductor L. Other methods include piloted switches (scaled versions of Q1 and Q2 coupled in parallel with the power switching devices), and differential voltage measurements of the drain-source on-resistance ($R_{DS\_ON}$) of each of Q1 and Q2. ILSENS may be a voltage or current signal depending upon the particular implementation.

The modulator 103 receives VOUT and/or a feedback signal VFB indicative of VOUT and ILSENS and generates the PWM signal for controlling the phase circuit 201. VFB may be a sensed or proportional signal indicative of VOUT, such as developed by a voltage divider or the like (not shown). In operation, the modulator 103 uses ILSENS and VOUT (and/or VFB) and possibly other sensed signals or parameters and generates the PWM signal for purposes of loop regulation among other functions, such as voltage droop or the like. The gate driver 203 generates UG and LG based on PWM to turn on and off the electronic switches Q1 and Q2 to regulate the voltage level of VOUT.

The modulator 103 also receives the SVID command for providing the fast dynamic voltage response function. The modulator 103 also includes the droop function as further described herein for adjusting the output voltage VOUT based on ILSENS.

The present invention is illustrated using a synchronous buck-type switched mode voltage converter as the switched mode regulator, in which the input voltage is greater than the output voltage. It is appreciated, however, that the present invention is equally applicable to other types of voltage converters, such as non-synchronous switching voltage regulators, boost type converters (in which the output voltage is boosted higher relative to the input voltage), and various hybrid forms thereof, such as buck-boost and/or boost-buck and the like, as well as various known transformer-coupled switching regulator topologies. It is readily apparent to those of ordinary skill in the art that fast dynamic voltage response and droop control as described herein is equally applicable to any type of switched mode regulator.

Figure 3:
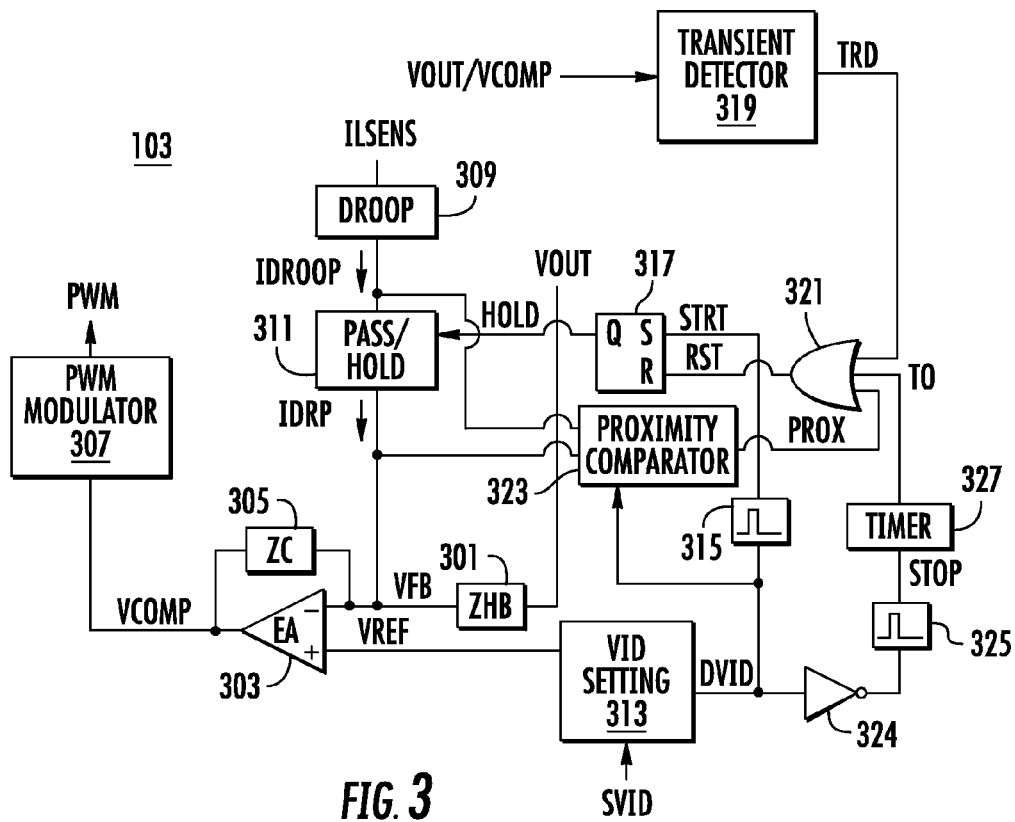
FIG. 3 is a simplified schematic and block diagram of an exemplary configuration of the modulator of FIGS. 1 and 2 incorporating fast dynamic response with droop control according to one embodiment of the present invention.

FIG. 3 is a simplified schematic and block diagram of an exemplary configuration of the modulator 103 incorporating fast dynamic response with droop control according to one embodiment of the present invention. The output voltage VOUT is provided to a feedback network 301 shown as "ZFB," in which "Z" denotes an impedance value such as including resistors and capacitors or the like for developing a feedback signal VFB indicative of VOUT. In one embodiment, for example, ZFB 301 may be a simple voltage divider provided externally to the controller integrated circuit (IC) or chip which allows a designer to choose a voltage range for VOUT. In another embodiment, ZFB 301 may be provided internally or on-chip in which VOUT is provided directly to a pin on the controller IC.

An error amplifier (EA) 303 receives VFB at its negative ("−" or inverting) input and receives a reference voltage VREF at its positive ("+" or non-inverting) input. Another feedback network 305 shown as "ZC" is coupled between the negative input and output of the error amplifier 303, in which ZC 305 includes additional capacitor and/or resistor components configured as a compensation network or the like as understood by those of ordinary skill in the art for developing a compensation voltage VCOMP. VCOMP is provided to a PWM modulator 307 which outputs the PWM signal. As previously described, PWM is provided to the gate driver 203 for controlling switching of the power switches Q1 and Q2 for regulating the voltage level of VOUT. The error amplifier 303, ZC 305 and the PWM modulator 307 are usually provided within the controller chip, whereas the gate driver 203 and switches Q1 and Q2 may or may not be provided on the chip depending upon the particular configuration.

The ILSENS signal is provided to the input of a droop control network 309, which outputs a corresponding IDROOP current signal for controlling the droop function previously described. In one embodiment, the droop control network 309 receives ILSENS as an analog signal (voltage or current) and provides IDROOP as an analog current signal. In a conventional configuration, IDROOP may be provided directly to the VFB node of the control loop for adjusting operation to control VOUT according to droop operation. Instead, IDROOP is provided to a pass/hold network 311 which also receives a HOLD signal. When HOLD is low, the pass/hold network 311 operates the modulator 103 in a pass condition in which the IDROOP signal as passed as an output droop current signal IDRP. Thus, when HOLD is low indicating the pass condition, IDRP is the same as IDROOP or a mirrored or duplicated version thereof (IDRP=IDROOP) so that the droop function is performed without modification. When HOLD is asserted high, however, a hold condition is indicated in which IDRP is held at the value of IDROOP at the time when HOLD was asserted and remains at the held value for as long as HOLD is high. Thus, while HOLD is high indicating the hold condition, IDRP remains substantially steady regardless of any further changes of IDROOP. After HOLD is asserted back low, the hold condition is removed and IDRP once again follows IDROOP in the pass condition. As further described herein, this hold function enables fast dynamic voltage response to be performed without a conflict from the droop function.

The SVID command is provided to a VID setting network 313, which sets the voltage value of VREF in response. An external device, such as the processor 107, provides a VID value via the SVID command to adjust the output voltage VOUT. When VID is changed or updated, the VID setting network 313 begins adjusting VREF and outputs a DVID signal indicating the change of the VID value. In one embodiment, DVID is a logic signal which may be asserted high while the controller is changing a digital to analog converter (DAC) setting and which may then be asserted low when the DAC setting reaches its final value. A one-shot pulse device 315 has an input receiving DVID and outputs a start pulse STRT in response to a rising edge of DVID. The STRT pulse signal is provided to a set (S) input of a set-reset (SR) latch or flip-flop 317. The SR latch 317 asserts its Q output high in response to the STRT pulse, which thus asserts the HOLD signal high. As previously described, when HOLD goes high, IDRP is held by the pass/hold network 311 at the value of IDROOP when HOLD went high and remains at or substantially near the held value for as long as HOLD is high. When VREF is being updated by the VID setting network 313, the droop network 309 senses a change of output inductor current and adjusts IDROOP accordingly. However, while HOLD is high, the pass/hold network 311 ignores the change of IDROOP and holds IDRP at a fixed value or substantially the same level. In this manner, the droop network 309 is substantially inhibited from adjusting the control loop in response to the change of VREF initiated by the VID setting network 313.

The modulator 103 is equipped with one or more reset mechanisms for removing the HOLD condition asserted by the SR latch 317. A transient detector 319 receives VOUT or VCOMP and detects a load insertion transient or a load release transient and asserts a transient detect signal TRD at its output. In one embodiment, the transient detector 319 is provided on-chip and if VOUT is also provided to an input of the controller chip, then VOUT may be provided directly to the transient detector 319. Alternatively, VCOMP may be used for sensing transient events. The particular implementation of the transient detector 319 is configured depending upon which signal is being used for transient detection. VOUT, for example, does not vary as much as VCOMP so that the transient detector 319 is configured accordingly.

The TRD signal is provided to one input of a multiple-input (e.g., 3-input) OR gate 321, which asserts a reset signal RST at its output to the reset (R) input of the SR latch 317. Thus, when a load transient (insertion or release) is detected by the transient detector 319, it asserts (or pulses) TRD high to the input of the OR gate 321, which asserts RST high to reset the SR latch 317. In response, the SR latch 317 negates HOLD (asserts HOLD low) so that the pass/hold network 311 removes the hold condition and returns to normal droop operation by passing IDROOP to IDRP. In one embodiment, the transient event may take precedence over the hold condition in which it is desired that the modulator 103 respond to the transient event with droop control even if the dynamic voltage response has not completed its transition. Thus, the hold condition may be removed to enable response to the transient event regardless of the status of the dynamic voltage response to the SVID command. It is noted, however, that the external device providing the SVID command may play a dominant role in causing the transient events (e.g., controlling CPU or microprocessor), so that the controlling device may wait for the output voltage VOUT to transition to the new target value before initiating a transient event.

It is noted that the change of VREF initiated by the VID setting network 313 causes a corresponding change of VCOMP and VOUT, which might otherwise be incorrectly interpreted as a transient event by the transient detector 319. In one embodiment, the transient detector 319 is configured to detect changes that are greater or faster than the responses which are expected by the change of VREF initiated by the VID setting network 313. Alternatively or in addition, the transient detector 319 may monitor VREF to facilitate this determination. Alternatively, the transient detector 319 may be omitted to avoid conflict with the dynamic voltage response.

A proximity comparator 323 receives IDROOP, IDRP and DVID at corresponding inputs and provides a proximity signal PROX at its output to another input of the OR gate 321. The proximity comparator 323 keeps PROX asserted low while DVID is high and allows PROX to go high when DVID is low. The proximity comparator 323 monitors IDROOP and IDRP and asserts (or pulses) PROX high when IDROOP is within a predetermined proximity of IDRP. When PROX is asserted (or pulsed) high, the OR gate 321 asserts RST to reset the SR latch 317 to pull HOLD low and remove the hold condition. The relative proximity between IDROOP and IDRP may be configured according to the particular application or implementation. Once IDROOP is sufficiently close to IDRP, the hold condition is removed by the proximity comparator 323.

DVID is further provided to the input of an inverter 324, having its output provided to an input of another one-shot pulse device 325. The output of the pulse device 325 asserts a STOP pulse signal to an input of a timer 327. The timer 327 provides a timeout signal to another input of the OR gate 321. When DVID goes low indicating that VID has changed to its new value, the pulse device 325 responds to the falling edge of DVID and momentarily pulses STOP high. In response to the STOP pulse from the pulse device 325, the timer 327 delays for a time period established by the timer 327 and then asserts TO high upon timeout. In this manner, upon timeout of the timer 327, the SR latch 317 clears the hold condition by pulling HOLD back low. The timer 327 may have a predetermined or fixed time period, or may be programmable or adjustable to program a suitable time period for removing the hold condition in response to STOP. In one embodiment, the timer 327 provides a failsafe mechanism to remove the hold condition to allow normal droop operation in the event the other release events (TRD, PROX, etc.) fail to remove the hold condition within a reasonable amount of time after the SVID command.

In summary, the VID setting network 313 asserts DVID which pulses STRT high to initiate a dynamic voltage response, in which case the SR latch 317 asserts HOLD to initiate the hold condition. During the hold condition while HOLD is asserted, IDRP is held at the value of IDROOP upon initiation of the hold condition, and IDROOP is temporarily blocked from applying the droop function to allow the dynamic voltage response to complete operation. Since the droop function is blocked in this manner, the dynamic voltage response may complete much faster since not in conflict with droop operation. Once the dynamic voltage response completes, such as when IDROOP returns to within proximity of IDRP or after timeout of the timer 327 in response to a STOP pulse, the hold condition is removed and normal droop operation is resumed. Also, the hold condition may be removed in response to TRD indicating a transient event. Additional termination factors may be considered for removing the hold condition.

Each of the blocks 309, 311, 313, 319 and 323 may be implemented using an analog configuration or a digital configuration or using any combination thereof.

Figure 4:
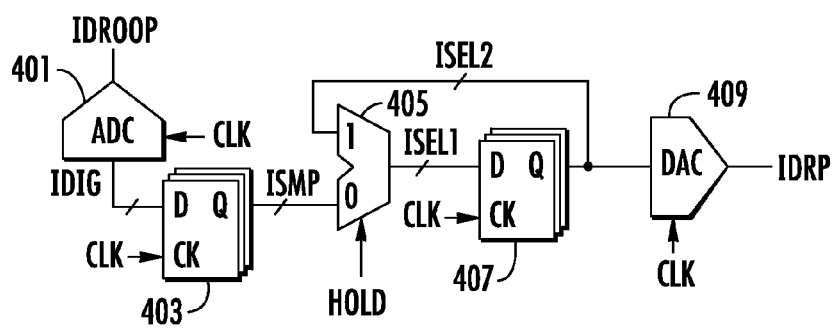
FIG. 4 is a simplified block diagram of a pass/hold network implemented according to a digital embodiment which may be used as the pass/hold network of FIG. 3.

FIG. 4 is a simplified block diagram of a pass/hold network 400 implemented according to a digital embodiment which may be used as the pass/hold network 311. The IDROOP current is provided to an input of an analog to digital converter (ADC) 401, which receives a clock signal CLK at its clock input. The CLK signal toggles at a selected frequency and the ADC 401 samples IDROOP signal at clock cycles to provide corresponding digital samples as a digital signal IDIG. Each bit of IDIG is provided to corresponding data (D) inputs of a set of D-type latches 403 each receiving CLK at respective clock inputs. The D-type latches 403 may collectively be considered as a sample register for storing digital samples of IDROOP. The number of the D-type latches 403 generally corresponds to the resolution of the ADC 401 to provide a resolution for maintaining a desired accuracy of the IDROOP signal.

The Q outputs of the D-type latches 403 collectively provide a digital sample signal ISMP1 to respective bits of a first input (e.g., the logic zero or "0" input) of a multiplexer (MUX) 405 receiving the HOLD signal at its select input. The output of the MUX 405 provides a first digital select signal ISEL1 having corresponding bits provided to respective D inputs of another set of D-type latches 407 each receiving CLK at respective clock inputs. The D-type latches 403 may collectively be considered as a hold register for storing the digital samples of IDROOP. The number of the D-type latches 407 403 generally corresponds to number of the D-type latches 403. The Q outputs of the D-type latches 407 collectively provide another digital sample signal ISMP2 to respective bits of a second input (e.g., the logic one or "1" input) of the MUX 405 and to respective inputs of a digital to analog converter (DAC) 409 also receiving CLK. The output of the DAC 409 provides the IDRP signal.

In operation of the pass/hold network 400, IDROOP is continuously sampled to provided corresponding digital samples as ISMP provided to the "0" input of the MUX 405. When HOLD is low, the ISMP signal is provided as the ISEL1 signals provided to the D-type latches 407 for conveying the digital samples to the DAC 409. The DAC 409 converts the digital samples of the IDROOP signal as the secondary droop signal IDRP. Thus, during the pass condition when HOLD is low, IDRP follows IDROOP. When HOLD is asserted high for the hold condition, the MUX 405 is switched to select the ISEL2 output of the D-type latches 407 so that the D-type latches 407 are continuously updated with last value of the ISMP signal when HOLD was asserted. In this manner, the ISMP with updated samples of IDROOP are bypassed and instead the value in the hold register of the D-type latches 407 is used in successive cycles of CLK to develop IDRP. In this manner, IDRP is held at substantially the same value during the hold condition. When HOLD is subsequently negated to return to the pass condition, the MUX 405 once again selects the ISMP signals so that IDRP follows IDROOP for normal operation.

Figure 8:
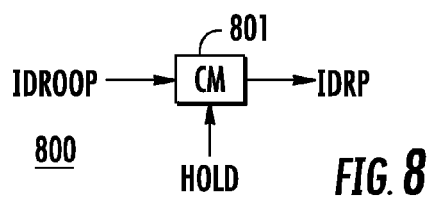
FIG. 8 is a simplified diagram depicting a pass/hold network implemented according to an analog embodiment which may be used as the pass/hold network 311.

FIG. 8 is a simplified diagram depicting a pass/hold network 800 implemented according to an analog embodiment which may be used as the pass/hold network 311. In this case, IDROOP is provided to a current mirror (CM) 801 providing IDRP at its output. The CM 801 is further configured to receive HOLD as a control signal for controlling operation. In particular, when HOLD is asserted low, the CM 801 operates as a normal current mirror in which IDRP is a mirrored version of IDROOP during the pass condition. When HOLD is asserted high for the hold condition, the value of IDRP generally remains unmodified.

Figure 5:
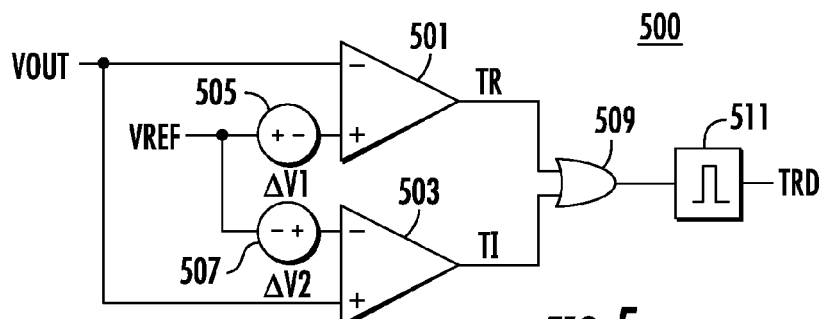
FIG. 5 is a schematic diagram of a transient detector implemented according to one embodiment which may be used as the transient detector of FIG. 3 when monitoring the output voltage for detecting load transients.

FIG. 5 is a schematic diagram of a transient detector 500 implemented according to one embodiment which may be used as the transient detector 319 when monitoring VOUT for detecting load transients. VOUT is provided to the negative input of a first comparator 501 and to the positive input of a second comparator 503. VREF is provided to a positive terminal of a first voltage source 505 developing a first offset voltage $\Delta V1$ and to the negative terminal of a second voltage source 507 developing a second offset voltage $\Delta V2$. The negative terminal of the voltage source 505 is provided to the positive input of the comparator 501 and the positive terminal of the voltage source 507 is provided to the negative input of the comparator 503. The output of the comparator 501 provides a transient release (TR) signal and the output of the comparator 503 provides a transient insertion (TI) signal, in which TR and TI are provided to respective inputs of a logic OR gate 509. The output of the OR gate 509 is provided to an input of a pulse device 511, which provides TRD at its output.

In operation of the transient detector 500, when VOUT rises above VREF by the offset voltage ΔV2, TI is asserted high indicating a load release event, and TRD is pulsed high to reset the SR latch 317 and pull HOLD low. Also, when VOUT falls below VREF by the offset voltage ΔV1, TR is asserted high indicating a load insertion event, and TRD is pulsed high to reset the SR latch 317 and pull HOLD low. In one embodiment, VOUT is provided directly to the controller chip in which VREF has a voltage level at the target level of VOUT. In one embodiment, ΔV1 and ΔV2 are configured to have voltage values which are greater than expected deviations of VOUT with respect to VREF caused by the change of VREF initiated by the VID setting network 313.

Figure 6:
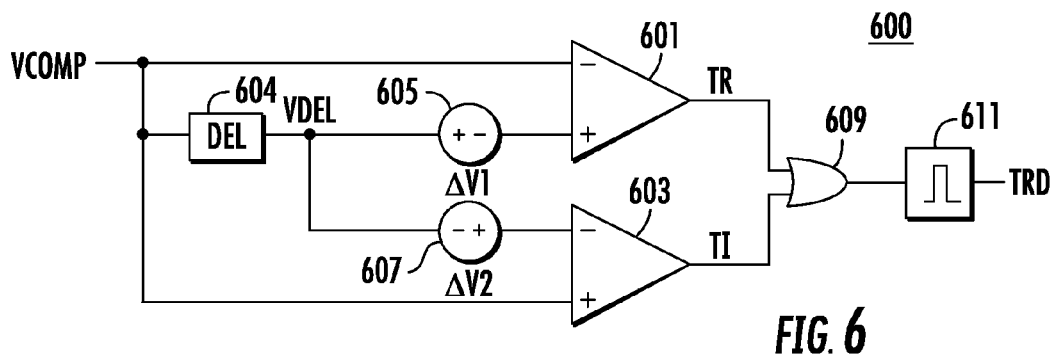
FIG. 6 is a schematic diagram of a transient detector implemented according to another embodiment which may be used as the transient detector of FIG. 3 when monitoring the compensation voltage for detecting load transients.

FIG. 6 is a schematic diagram of a transient detector 600 implemented according to another embodiment which may be used as the transient detector 319 when monitoring VCOMP for detecting load transients. The transient detector 600 may be implemented in a similar manner as the transient detector 500. In this case, VCOMP is provided to the negative input of a first comparator 601 and to the positive input of a second comparator 603. VCOMP is also provided to an input of a delay (DEL) device 604, which outputs a delayed version of VCOMP shown as a signal VDEL. VDEL is provided to a positive terminal of a first voltage source 605 developing a first offset voltage ΔV1 and to the negative terminal of a second voltage source 607 developing a second offset voltage ΔV2. The negative terminal of the voltage source 605 is provided to the positive input of the comparator 601 and the positive terminal of the voltage source 607 is provided to the negative input of the comparator 603. The output of the comparator 601 provides the transient release (TR) signal and the output of the comparator 603 provides the transient insertion (TI) signal, in which TR and TI are provided to respective inputs of a logic OR gate 609. The output of the OR gate 609 is provided to an input of a pulse device 611, which provides TRD at its output.

In operation of the transient detector 600, when VCOMP rises at a sufficiently fast rate so that it rises above VDEL by the offset voltage ΔV2 indicative of a load insertion event, TI is asserted high so that TRD is pulsed high to reset the SR latch 317 and pull HOLD low. Also, when VCOMP falls at a sufficiently fast rate so that it falls below VDEL by the offset voltage ΔV1 indicative of a load release event, TR is asserted high so that TRD is pulsed high to reset the SR latch 317 and pull HOLD low. The delay of the delay device 604 and the offset voltages ΔV1 and ΔV2 are collectively configured to correspond to expected voltage deviations of VCOMP with respect to VDEL indicative of the corresponding transient events that further distinguish the change of VREF initiated by the VID setting network 313. In one embodiment, the delay device 604 may be implemented as a simple resistor-capacitor (RC) filter or the like, although more sophisticated implementations are contemplated.

Figure 7:
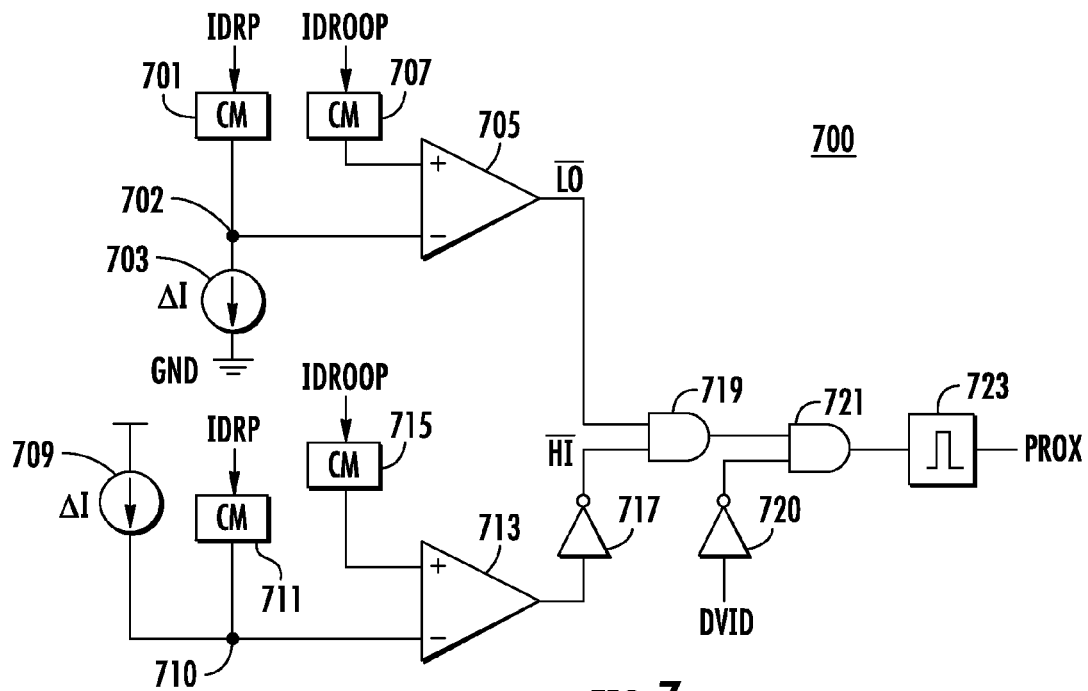
FIG. 7 is a schematic and block diagram of a proximity comparator implemented according to one embodiment which may be used as the proximity comparator of FIG. 3.

FIG. 7 is a schematic and block diagram of a proximity comparator 700 implemented according to one embodiment which may be used as the proximity comparator 323. The current IDRP is provided to a current mirror 701, which mirrors IDRP into a current summing node 702. A current sink 703 draws an offset current ΔI from node 702 to GND, so that a difference current (IDRP−ΔI) is provided by node 702 to the negative input of a current comparator 705. IDROOP is mirrored by a current mirror 707 to the positive input of the comparator 705, which outputs a logic signal "not low" or $\overline{LO}$. A current source 709 sources the offset current ΔI into a current summing node 710, and a current mirror 711 also mirrors current IDRP into node 710. Thus, a sum current (IDRP+ΔI) is provided by node 710 to the negative input of another current comparator 713. IDROOP is mirrored by a current mirror 715 to the positive input of the comparator 713, which outputs a logic signal to an input of an inverter 717. The inverter 717 outputs a signal "not high" or $\overline{HI}$. The signals $\overline{HI}$ and $\overline{LO}$ are provided to respective inputs of a logic AND gate 719, having its output coupled to one input of another logic AND gate 721. DVID is provided to an input of an inverter 7201, having its output coupled to the other input of the AND gate 721. The output of the AND gate 721 is provided to an input of a one-shot pulse device 723, which provides the PROX signal at its output.

In operation of the proximity comparator 700, when DVID is high (during a change of VID), PROX is held low. When DVID goes back low and while IDROOP is greater than or less than IDRP by the offset current ΔI, one of the $\overline{HI}$ and $\overline{LO}$ signals is asserted low so that PROX is low. In this case, when IDROOP is less than IDRP−ΔI, $\overline{LO}$ is asserted low, and when IDROOP is greater than IDRP+ΔI, $\overline{HI}$ is asserted low. When DVID is low and when IDROOP is within ΔI of IDRP, then both of the $\overline{HI}$ and $\overline{LO}$ signals are asserted high so that PROX is pulsed high. In this case, when IDROOP is greater than IDRP−ΔI, $\overline{LO}$ is asserted high, and when IDROOP is less than IDRP+ΔI, $\overline{HI}$ is asserted high. The value of ΔI is selected to be a value sufficiently small so that when IDROOP is within ΔI of IDRP, the signals are said to be within sufficient proximity to remove the hold condition. As previously described, when PROX is asserted high, the SR latch 317 is reset to pull HOLD back low.

In an alternative embodiment, the proximity comparator 323 may be configured as a digital circuit which compares the digital samples of IDROOP stored in the sample register 403 with the digital value in the hold register 409 for making the proximity determination while HOLD is asserted high for the hold condition. In this case, ΔI may be represented by a digital proximity value. In one digital configuration embodiment, during the hold condition, the digital proximity value is added to and subtracted from the digital hold value stored in the hold register 409 to provide a digital proximity range, and the upper and lower digital proximity range values are compared with the sample values being updated in the sample register 403 to make the proximity determination.

Figure 9:
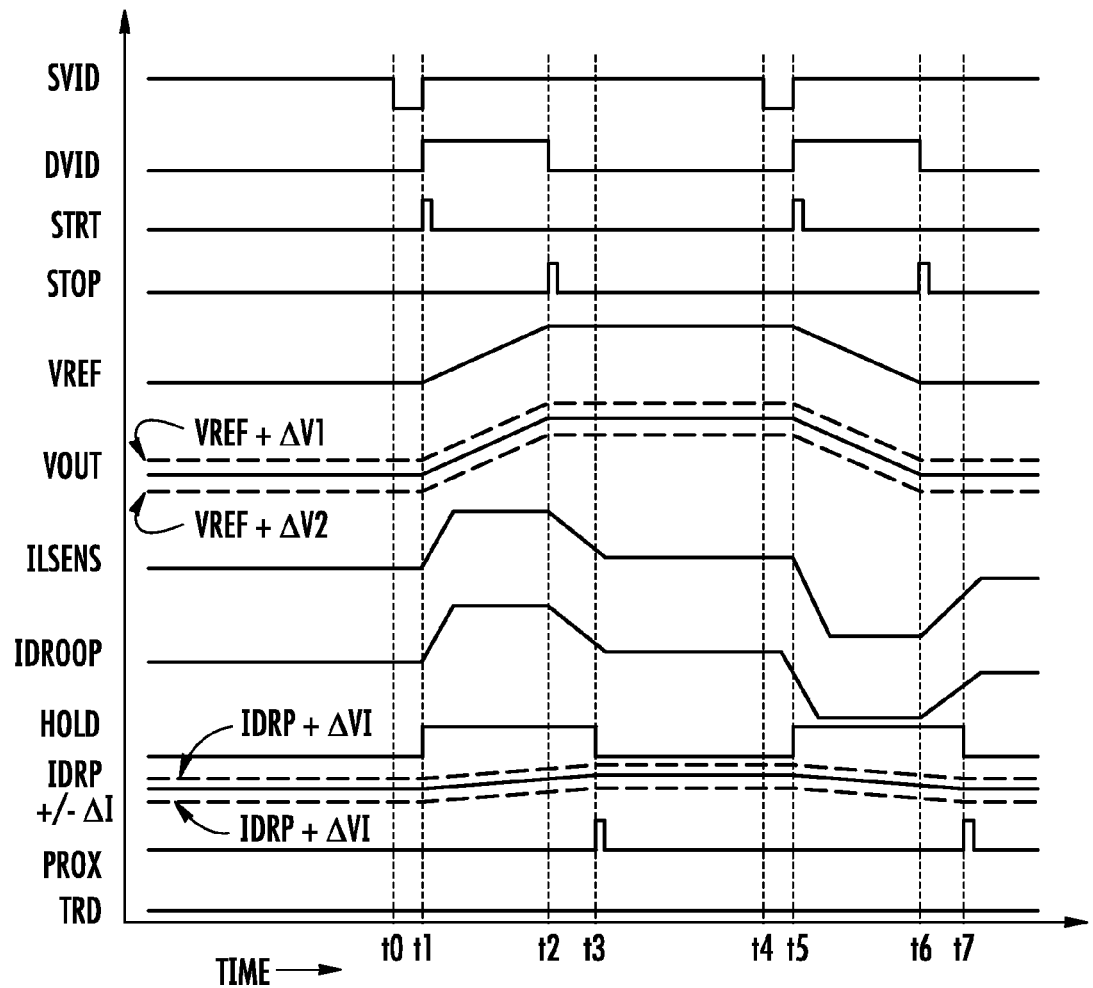
FIG. 9 is a timing diagram in which signals of the modulator of FIG. 3 are plotted versus time illustrating operation during pass and hold conditions in response to a pair of SVID commands.

FIG. 9 is a timing diagram in which the SVID, DVID, STRT, STOP, VREF, VOUT, ILSENS, IDROOP, HOLD, IDRP, PROX and TRD signals are plotted versus time illustrating operation of the modulator 103 shown in FIG. 3 during pass and hold conditions in response to a pair of SVID commands. It is noted that SVID is drawn in simplified form as a high/low logic signal. The illustrated SVID signal, however, represents an envelope of time in which clock/data lines are transmitting serial data to the regulator controller to change the output voltage. A pair of dashed lines plotting VREF+ΔV1 and VREF−ΔV1 are plotted with VOUT, and another pair of dashed lines plotting IDRP±ΔI are plotted with IDRP. SVID is shown in simplified form in which it is normally high and is pulled low while an SVID command is being provided.

At an initial time t0, SVID is pulled low indicating the start of a new SVID command. The remaining signals are shown at initial levels. Upon completion of the SVID command at time t1, SVID is pulled high and the VID setting network 313 asserts DVID high indicating a DAC change while the controller is changing the VID value. In response to DVID going high, the pulse device 315 asserts a pulse on STRT causing the SR latch 317 to latch the HOLD signal high. DVID remains high while VID is being changed and while VREF ramps to its new value. In this case, the new VID value indicates an increase of VOUT. In response to VREF changing, ILSENS indicates increased current in the output inductor L and VOUT ramps up accordingly to effectuate the change. IDROOP also changes in an attempt to apply the droop function. Since HOLD is high indicating the hold condition, however, the change of IDROOP is blocked by the pass/hold network 311 in which IDRP remains substantially unmodified.

In one embodiment, changes of IDROOP are completely blocked by the pass/hold network 311 while HOLD is high. In another embodiment, the pass/hold network 311 filters IDROOP so that IDROOP is not completely blocked in which a portion of the new droop information is allowed to pass through. Even if some droop information is allowed to pass, IDRP remains substantially unmodified during the hold condition to enable fast dynamic voltage response.

At a subsequent time t2, the VID setting network 313 asserts DVID back low indicating that the DAC change is complete. At this time t2, VREF and VOUT have completed their transition to the new values in accordance with the new VID value. The falling edge of DVID results in a pulse of the STOP signal initiating the timer 327. The HOLD signal, however, remains asserted at time t2. ILSENS and IDROOP ramp back towards their steady state values. At a subsequent time t3, the proximity comparator 323 detects that ILSENS is within the proximity (e.g., ΔI) of IDRP and pulses the PROX signal high. The OR gate 321 responds by asserting the reset signal RST high resetting the SR latch 317 pulling HOLD low to return to the pass condition.

It is appreciated that if the entire IDROOP signal was otherwise passed without operation of the hold condition, the output signal VOUT would not have settled to its new value by the time t2 but would have taken significantly more time.

At a subsequent time t4, SVID is pulled low indicating the start of a another SVID command. The remaining signals are shown at initial levels. Upon completion of the SVID command at time t5, SVID is pulled high and the VID setting network 313 asserts DVID high again indicating another DAC change while the controller is changing the VID value. In response to DVID going high, the pulse device 315 asserts a pulse on STRT causing the SR latch 317 to latch the HOLD signal high. DVID remains high while VID is being changed and while VREF ramps to its new value. In this case, the new VID value indicates a decrease of VOUT. In response to VREF changing, ILSENS indicates decreased current in the output inductor L and VOUT ramps down accordingly to effectuate the change. IDROOP also changes in an attempt to apply the droop function. Since HOLD is high indicating the hold condition, however, the change of IDROOP is blocked by the pass/hold network 311 in which IDRP remains substantially unmodified.

At a subsequent time t6, the VID setting network 313 asserts DVID back low indicating that the DAC change is complete. At this time t6, VREF and VOUT have completed their transition to the new values in accordance with the new VID value. The falling edge of DVID results in another pulse of the STOP signal initiating the timer 327. The HOLD signal, however, remains asserted at time t6. ILSENS and IDROOP ramp back towards their steady state values. At a subsequent time t7, the proximity comparator 323 detects that ILSENS is within the proximity (e.g., ΔI) of IDRP and pulses the PROX signal high. The OR gate 321 responds by asserting the reset signal RST high resetting the SR latch 317 pulling HOLD low to return to the pass condition.

Again, it is appreciated that if the entire IDROOP signal was otherwise passed without operation of the hold condition, the output signal VOUT would not have settled to its new value by the time t6 but would have taken significantly more time.

A dynamic voltage response network for a switching regulator with droop control providing a droop control signal according to one embodiment includes a voltage identification setting network, a pass and hold system, and a reset network. The voltage identification setting network initiates a hold condition and adjusts an output voltage reference in response to a change in a voltage identification input. The pass and hold system passes the droop control signal during a pass condition and holds the droop control signal during the hold condition. The reset network resets the pass and hold system to the pass condition in response to a reset signal. The reset signal may be provided in response to a variety of conditions, such as load transients, proximity between the developed droop control signal and the held droop control signal, timeout after the output voltage reference is adjusted, among other reset conditions.

A method of dynamic voltage response network for a switching regulator with droop control providing a droop control signal according to one embodiment includes passing the droop control signal when a hold signal is negated and holding the droop control signal when the hold signal is asserted, asserting the hold signal and adjusting an output voltage reference in response to receiving a change in a voltage identification input, and negating the hold signal in response to a reset signal.

An electronic device according to one embodiment includes a voltage regulator and a dynamic voltage response network as described herein. The voltage regulator may include a phase circuit, an error amplifier, a pulse modulator, a current sensing system, and a droop controller. The phase circuit selectively switches an input voltage through an output inductor based on a pulse control signal for regulating an output voltage. The error amplifier compares a feedback voltage indicative of the output voltage with a reference voltage and provides a compensation signal indicative thereof. The pulse modulator develops the pulse control signal based on the compensation signal. The current sensing system senses current through the output inductor and provides a current sense signal indicative thereof. The droop controller receives the current sense signal and provides a first droop control signal for implementing droop control. The dynamic voltage response network may include a voltage identification setting network, a pass and hold system, and a reset network.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:
1. A dynamic voltage response network for a switching regulator with droop control providing a droop control signal, comprising:

a voltage identification setting network which initiates a hold condition and adjusts an output voltage reference in response to a change in a voltage identification input;

a pass and hold system which passes the droop control signal during a pass condition and which holds the droop control signal during said hold condition; and a reset network which resets said pass and hold system to said pass condition in response to a reset signal.

2. The dynamic voltage response network of claim 1, wherein said pass and hold system comprises:

a latch which latches a hold signal indicative of said hold condition, wherein said latch negates said hold signal indicative of said pass condition in response to said reset signal; and a pass and hold block which passes the droop control signal while said hold signal is negated, and which holds the droop control signal at about its last value when said hold signal is asserted.

3. The dynamic voltage response network of claim 2, wherein said pass and hold block comprises:

an analog to digital converter for converting the droop control signal to digital samples;

a sample register which stores and outputs each of said digital samples as provided;

select logic which selects an output of said sample register when said hold signal is negated and which selects an output of a hold register when said hold signal is asserted for providing first selected digital values;

said hold register storing each of said first selected digital values as provided and having its output providing second selected digital values to said select logic;

a digital to analog converter which converts said second selected digital values as an output droop control signal.

4. The dynamic voltage response network of claim 1, wherein:

said pass and hold system inputs the droop control signal as a first droop control signal and which outputs a second droop control signal for droop control; and wherein said reset network comprises a proximity comparator which asserts said reset signal when said first and second droop control signals are within a predetermined proximity of each other.

5. The dynamic voltage response network of claim 4, wherein said proximity comparator asserts said reset signal when said first and second droop control signals are within a predetermined offset relative to each other.

6. The dynamic voltage response network of claim 1, wherein said reset network comprises a transient detector which compares an output voltage with said output voltage reference and provides said reset signal when said output voltage is separated from said output voltage reference by a predetermined offset.

7. The dynamic voltage response network of claim 1, further comprising:

an error amplifier which compares said output voltage reference with a signal indicative of an output voltage and which provides a compensation signal indicative thereof; and a transient detector which asserts said reset signal when said compensation signal indicates a load transient.

8. The dynamic voltage response network of claim 7, wherein said transient detector comprises:

a delay device which receives said compensation signal and which provides a delayed compensation signal; and a comparator network compares said compensation signal with said delayed compensation signal and which provides said reset signal when said compensation signal is separated from said delayed compensation signal by a predetermined offset.

9. The dynamic voltage response network of claim 1, wherein:

said voltage identification setting network asserts a stop signal after said output voltage reference is adjusted; and wherein said reset network comprises a timer which asserts said reset signal upon expiration of a predetermined time period after said stop signal is asserted.

10. A method of dynamic voltage response network for a switching regulator with droop control which provides a droop control signal, said method comprising:

passing the droop control signal when a hold signal is negated and holding the droop control signal when the hold signal is asserted;

asserting the hold signal and adjusting an output voltage reference in response to receiving a change in a voltage identification input; and negating the hold signal in response to a reset signal.

11. The method of claim 10, wherein said passing the droop control signal when a hold signal is negated and holding the droop control signal when the hold signal is asserted comprises:

passing the droop control signal as a second droop control signal which follows the droop control signal while the hold signal is negated;

providing the second droop control signal to adjust feedback of the switching regulator;

determining a present value of the droop control signal when the hold signal is asserted; and holding the second droop control signal based on the present value while the hold signal is asserted.

12. The method of claim 10, wherein said passing the droop control signal when a hold signal is negated and holding the droop control signal when the hold signal is asserted comprises:

converting the droop control signal to first digital samples;

selecting the first digital samples when the hold signal is negated and selecting second digital samples when the hold signal is asserted and providing selected digital samples;

providing the selected digital samples as the second digital samples; and converting the selected digital samples as an output droop control signal.

13. The method of claim 10, further comprising:

passing the droop control signal as a second droop control signal which follows the droop control signal while the hold signal is negated and which is held when the hold signal is asserted;

comparing the droop control signal with the second droop control signal; and asserting the reset signal when the droop control signal is within a predetermined proximity of the second droop control signal.

14. The method of claim 10, further comprising:

comparing an output voltage with the output voltage reference; and asserting the reset signal when the output voltage is separated from the output voltage reference by a predetermined offset.

15. The method of claim 10, further comprising:

comparing a feedback signal indicative of an output voltage with the output voltage reference and providing a compensation signal indicative thereof;

delaying the compensation signal for providing a delayed compensation signal;

comparing the compensation signal with the delayed compensation signal; and asserting the reset signal when the compensation signal is separated from the delayed compensation signal by a predetermined offset.

16. The method of claim 10, further comprising:

asserting a stop signal after the output voltage reference is adjusted in response to receiving a voltage identification input; and asserting the reset signal after a predetermined time period after the stop signal is asserted.

17. An electronic device, comprising:

a voltage regulator, comprising:
- a phase circuit which selectively switches an input voltage through an output inductor based on a pulse control signal for regulating an output voltage;
- an error amplifier which compares a feedback voltage indicative of said output voltage with a reference voltage and which provides a compensation signal indicative thereof;
- a pulse modulator which develops said pulse control signal based on said compensation signal;
- a current sensing system which senses current through said output inductor and which provides a current sense signal indicative thereof; and
- a droop controller which receives said current sense signal and which provides a first droop control signal for implementing droop control; and dynamic voltage response network, comprising:
- a voltage identification setting network which initiates a hold condition and adjusts an output voltage reference in response to a change in a voltage identification input;
- a pass and hold system which receives said first droop control signal and provides a second droop control signal for adjusting said feedback voltage, wherein said pass and hold system provides said second droop control signal to follow said first droop control signal during a pass condition and which holds said second droop control signal during said hold condition; and
- a reset network which resets said pass and hold system to said pass condition in response to a reset signal.

18. The electronic device of claim 17, further comprising a processor and a memory coupled to receive said output voltage, wherein said processor provides a voltage identification value to said voltage identification input.

19. The electronic device of claim 17, wherein said reset network comprises:
- a transient network which senses a load transient and which asserts a transient detect signal indicative thereof;
- a proximity comparator which compares said first and second droop control signals during said hold condition and which asserts a proximity signal when said first and second droop control signals are within a predetermined proximity to each other; and
- a logic network which asserts said reset signal in response to assertion of either one of said transient detect signal and said proximity signal.

20. The electronic device of claim 19, wherein:

said voltage identification setting network further asserts a stop signal after said an output voltage reference has been adjusted;

wherein said reset network further comprises a timer which asserts a timeout signal after expiration of a predetermined time period after said start signal is asserted; and wherein said logic network further asserts said reset signal in response to assertion of said timeout signal.

* * * * *